N. A. BAKER.

Improvement in Pawl Attachment.

No. 124,416. Patented March 12, 1872.

Attest
Frank P. Helm
Chas. H. Wicoes

Inventor
N A Baker

UNITED STATES PATENT OFFICE.

NOAH A. BAKER, OF COVINGTON, KENTUCKY, ASSIGNOR TO HIMSELF AND J. O'HARA, JR., OF SAME PLACE.

IMPROVEMENT IN PAWL ATTACHMENTS.

Specification forming part of Letters Patent No. 124,416, dated March 12, 1872.

Specification of the invention of NOAH A. BAKER, of an Improved Ratchet-Wheel and Pawl Attachment.

Figure 1:
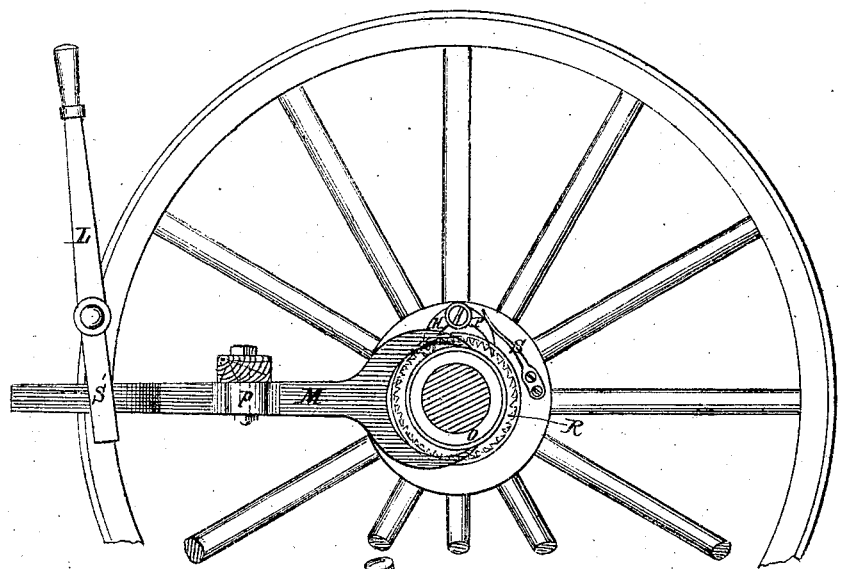

Figure 1 represents the apparatus on a plane, presenting an exterior view as applied to use in reapers and mowers, for which it is particularly designed.

R, ratchet-wheel attached to the axle of ground-wheel; P, pawl attached to ground-wheel, falling into ratchet-wheel R; H, rear shank of pawl P; K, heel on shank H; S, spring bearing upon pawl P; O, funnel-shaped sleeve on the axle of ground-wheel; M, horizontal lever operating the sleeve O; L, upright slotted lever controlling lever M.

Figure 2:
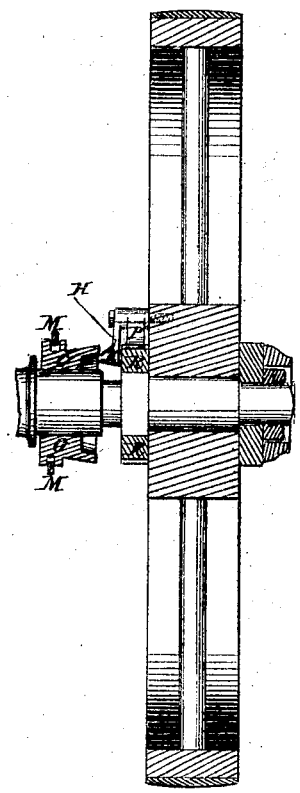

Fig. 2 represents a cross-section of Fig. 1.

R R, ratchet-wheel on axle of the ground-wheel; P P, pawl attached to ground-wheel, falling in ratchet R, invisible in this section; H, rear shank of pawl P; K, heel on shank H; O, funnel-shaped sleeve on axle of ground-wheel; M M, horizontal lever operating sleeve O, invisible in this section.

Figure 3:
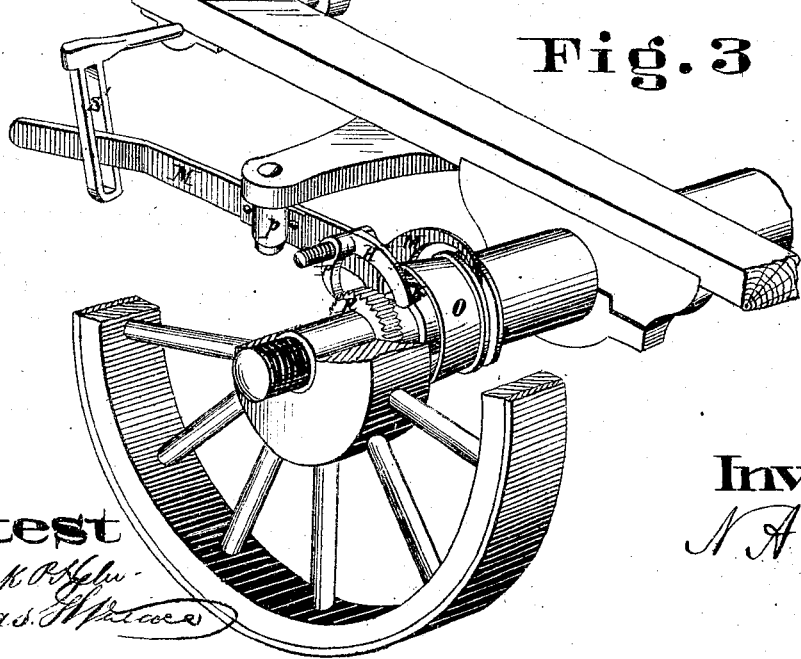

Fig. 3 represents in perspective a section of the apparatus, showing an interior view and the manner of its working when used on reapers or mowers.

R, ratchet-wheel attached to axle; P, pawl attached to ground-wheel, falling in ratchet R; H, rear shank of pawl P; K, heel on shank H; O, funnel-shaped sleeve on axle; M, horizontal lever-operating sleeve O; L, upright lever controlling lever M; S', slot in lever L, engaging the deflected end of lever M; p, pivot about which lever M turns.

The above-described invention may be applied to use in any rotary machinery where it is desirable to suspend the operation of the machinery which the motive power continues to work, and is particularly useful in reapers and mowers, the machinery being geared to the axle of the carriage, and the motive power applied through the ground-wheels. It should, for all practical purposes, be constructed in metal.

Its Operation.

The ratchet R, as shown in Fig. 3 of the accompanying drawing being fastened permanently on the axle, the pawl P, which is permanently attached to the ground-wheel, engages the ratchet R and revolves the axle with the ground-wheel. The funnel-shaped sleeve O, encircling the axle loosely but with sufficient bearing to give the required stability, being attached to the horizontal lever M, and standing out free from the ratchet and pawl while the machinery is in motion, is, by the use of the lever L, which, being brought forward, inclines the slotted shank S back, so as to engage the deflector end of the lever M, suddenly brought in contact by its inside surface with the heel K on the rear shank H of pawl P, bearing it down, and thereby lifting the pawl out of the ratchet, allowing the ground-wheel to revolve freely on the axle, moving the carriage along without working any part of the machinery.

It will be observed that in Fig. 3 the pawl and its attachment are reversed. Its appropriate position is forward of the axle, the horizontal lever projecting behind the axle. The same upright lever with slotted shank operates the apparatus for both wheels of a reaper or mower.

I claim as my invention, and for which I desire the patent to be issued—

The funnel-shaped sleeve encircling the axle, with the lever attachment, whereby it is brought in contact with the pawl by means of its heeled rear shank, holding it out of the ratchet, while the pawl, with its attachments, continues to revolve, as and for the purpose set forth.

N. A. BAKER.

Witnesses:
FRANK P. HELM,
CHAS. G. WALLACE.